Feb. 23, 1965 P. W. BACHMAN 3,170,870
REMOVING OCCLUDED AQUEOUS SYSTEM FROM HYDRATE CRYSTALS
Filed May 17, 1963 3 Sheets-Sheet 1

INVENTOR.
PAUL W. BACHMAN
BY *Olin E. Williams*
his Attorney

Feb. 23, 1965 P. W. BACHMAN 3,170,870
REMOVING OCCLUDED AQUEOUS SYSTEM FROM HYDRATE CRYSTALS
Filed May 17, 1963 3 Sheets-Sheet 3
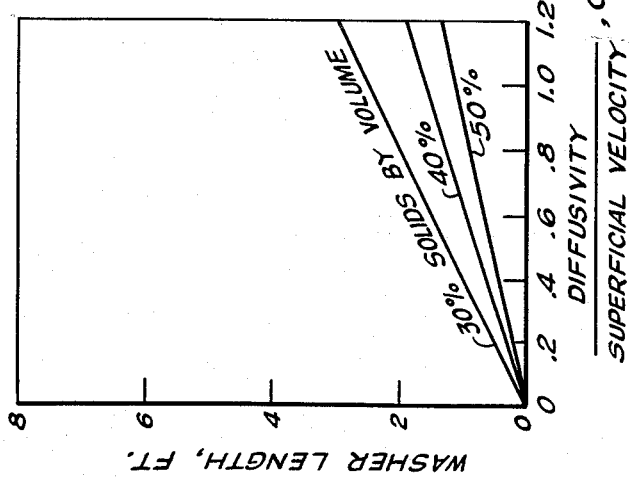
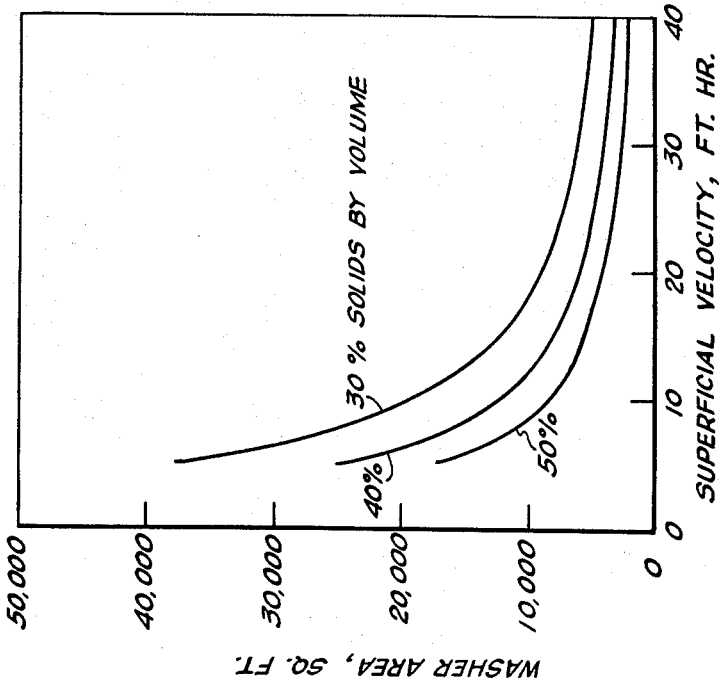
FIG. 6
INVENTOR.
PAUL W. BACHMAN
BY *Olin E. Williams*
his Attorney

United States Patent Office

3,170,870
Patented Feb. 23, 1965

3,170,870
REMOVING OCCLUDED AQUEOUS SYSTEM
FROM HYDRATE CRYSTALS
Paul W. Bachman, Pittsburgh, Pa., assignor to Koppers Company, Inc., a corporation of Delaware
Filed May 17, 1963, Ser. No. 281,239
3 Claims. (Cl. 210—59)

This invention relates to a method for separating water from aqueous saline solutions in which the aqueous saline solution is mixed directly with a hydrate forming substance under hydrate forming conditions whereby a hydrate separable from the salt solution is formed. The invention has particular reference to an improved method for removing occluded, adsorbed and trapped saline water from hydrate crystals and agglomerates. A method for producing purified water from saline solutions such as sea water through the use of hydrate-forming reactions is described in U.S. Patent 2,904,511 by Wilm E. Donath.

This invention arose during performance pursuant to a contract with the United States Government, Office of Saline Water.

According to the foregoing Donath patent, purified water can be produced from saline water by forming a solid hydrate by combining a hydrate-forming agent with part of the water, separating the hydrate from enriched salt solution, decomposing the hydrate into a water phase and a phase containing the hydrate-forming agent and separating the two phases. In practice, the separation of solid hydrate from enriched salt solution is performed by filtration, centrifuging, crystallization and the like. This practice using the conventional filter-washer systems that are adaptable to separate the hydrate crystals from and cleanse the hydrate crystals of contaminating brine, comprise the most expensive segment of the process and equipment to be employed in producing purified water. This method requires a substantial power and time output. Additionally, a severe problem exists because this method cannot efficiently remove residual brine from the solid hydrate. The problem of brine removal is aggravated by the tendency of hydrate crystals (such as the crystals of propane hydrate) to form agglomerates which occlude, adsorb, or trap large quantities of the residual brine. For example, it is known that propane hydrate crystals can retain, after normal draining, as much as 70 percent or more by weight of saline water.

It is necessary that this residual saline water be effectively removed from the hydrate prior to the decomposition step so that upon decomposition of the hydrate crystals, a purified water results that is not to any great degree contaminated by saline water. Conventionally, the separation of solid hydrate from residual brine is effected by means of washing the hydrate crystals with large quantities of purified water previously produced in the process. The more purified water which must be used for the washing step, the less efficient will be the process. Additionally, the washing step for separation of product water has encountered contamination problems and these have added to the cost of operating the hydrate process.

It is an object of this invention, therefore, to provide an improved method for separating solid hydrate from occluded, adsorbed and trapped saline water which method overcomes the above-mentioned disadvantages.

In accordance with this invention, I have found that a substantial reduction in the purified water, as well as in the equipment for washing, can be effected by subjecting the crystals and/or crystal agglomerates to a pressure, prior to washing, which will effectively remove substantial portions of the initially associated salt water.

This invention comprises subjecting hydrate crystals and crystal agglomerates to pressure prior to washing while maintaining the crystals at a temperature at which they remain solid but the ambient saline water remains liquid. It is essential to maintain the pressure applied to the crystals above that pressure at which the hydrate decomposes at the temperature of operation and it is also essential that the pressure must be in a range that will effect an expulsion of the water and break down or shear the crystal agglomerates without decomposing the individual crystals. Decomposition from either temperature or pressure prior to removal of contaminating brine will cause contamination of the water separated from the hydrate. Thus it has been discovered that the brine retained by the compressed crystal mass can be reduced to such a degree that upon decomposition of the hydrate the aqueous phase contains only minimal amounts of dissolved salts.

In carrying out the process of this invention, it has been discovered that the behavior of propane hydrate crystals under pressure is very unusual in view of the great similarity between propane hydrate crystals and ordinary ice crystals. For example, when ice crystals are submitted to similar pressure application, the ice crystals undergo the phenomenon known as regelation whereby the ice crystals simply fuse together to form one solid mass of ice. In view of the similarities in structure and behavior between propane hydrate crystals and ice crystals it follows that one skilled in the art would expect this regelation phenomenon to occur during the application of pressure to hydrate crystals.

The structure of hydrates has been established by von Stackelberg and his co-workers by use of X-ray diffraction (reported in Naturwiss 36, 327, 359, 1949, Z. Elektrochem. 58, 104, 1954) and by Claussen (J. Chem. Phys. 19, 1425, 1951). These investigations have shown that all gas hydrates crystallize in either of two cubic structures in which the hydrate molecules are situated in cavities formed within a framework of water molecules linked together by hydrogen bond. The number and sizes of the cavities differ for the two cubic structures, but in each case, the water molecules are tetrahedrally coordinated as they are in ice crystals (Advances in Chemical Physics, vol. 2, page 4, J. H. vander Waals and J. C. Platteeuw).

It is therefore known that the surface of a hydrate crystal is made up only of water molecules in the same manner that the surface of an ice crystal is made up of water molecules and it would be expected that the phenomenon of regelation would result when two hydrate crystals are brought into contact with each other under pressure as occurs in the case of ice crystals.

As further indication of the similarity of behavior between hydrate crystals and ice, there is an expansion when water freezes and there is also an expansion when propane hydrate is formed from liquid propane and liquid water. The amount of heat given off when one pound of water freezes to ice is almost exactly the same as when one pound of water combines with a hydrate-forming agent in the liquid state to form a hydrate.

These similarities in behavior indicate that the intermolecular forces are almost identical in hydrate and in ice, an aspect which supplies ample basis for the prediction that the phenomenon of regelation should occur with the application of pressure to hydrate crystals. The failure of the occurrence of regelation is totally unexpected and indicates that the intermolecular forces are behaving in a different manner in hydrate than they do in the case of ice crystals. This particular behavior of hydrate crystals under pressure is absolutely essential to provide a separate and distinct process step for the conversion of sea water to purified water. If the individual hydrate crystals were to fuse together, they would trap, rather than release, the occluded aqueous solution to thereby prevent and to make useless the application of pressure prior to the separation step.

Although primary emphasis in the development of this process has been placed on the conversion of saline water to potable water, it should be well recognized that the method disclosed herein in connection with the formation of hydrate crystals is generally operable in dehydration procedures and as such is applicable in the removal of water from various other beverages, such as fruit juice, milk, beer and the like.

In addtion to limiting consideration to the conversion of saline water to potable water by way of example the method disclosed herein will be described using propane as the hydrate forming substance.

The advantages available in connection with filtering and washing propane hydrate crystals by the use of this method are also obtainable using other common gases, gas mixtures and gas liquid combinations which are known for their ability to form hydrates including those paraffin hydrocarbons (in addition to propane) having from one to four carbon atoms, carbon dioxide, mixtures of methane and ethane, propylene, ethylene, acetylene, methyl chloride, ethyl fluoride, chlorine, argon, etc. in gaseous or liquefied form.

In carrying out the process of this invention solid hydrate crystals containing residual brine are compressed by external pressure to squeeze residual brine from the crystals while the crystals are simultaneously maintained at a temperature at which they remain solid by removing the heat of compression from the mass at a rate sufficient to maintain the aforesaid temperature while applying a pressure in a range that will effect an expulsion of the water without breaking down or crushing individual crystals but breaking down in some measure crystal agglomerates. A wide range of compacting pressures are operable in this process depending only on the thoroughness of the brine removal that is desired. It should be understood that the term compacting pressure refers to mechanical pressure over and above the pressure of the vapor of the hydrate forming gas.

The solid hydrate crystals and agglomerates containing residual brine are introduced into a compacting chamber until the hydrate crystals fill the entire volume of the compacting cylinder. Compacting pressures as high as 20,000 p.s.i. are applied to the hydrate crystals enclosed in the compacting cylinder. The range of pressure to be applied will depend upon equipment capacity. I have found that pressures in the range of at least 10 to 100 p.s.i. are capable of removing residual brine in desirable quantities.

In accordance with a broad aspect of the present invention the invention comprises introducing a slurry containing hydrate brine into a cylinder or pressure vessel which is surrounded with temperature control means such as an insulated jacket, equipped at one end with a filter means and at the other end equipped with compressing means such as a tight fitting movable piston and compacting the hydrate crystals within the cylinder so as to remove excess brine from the crystal mass. The excess brine is then removed from the cylinder through a filtrate port while the compacted hydrate crystals are then washed by means of wash water which is introduced into the cylinder. Wash water will then flow through the compacted hydrate bed and out through the filter means. Because of the application of pressure to the hydrate crystals, the amount of purified water used in the washing step is considerably reduced. This results in a great saving in purified water used to wash and consequently increases the production in quantity of purified water.

Following washing, a heating means such as vapor of the hydrate may be introduced whereby part or all of the hydrate vapor forming substance condenses on the compacted hydrate causing the hydrate to decompose into two liquid phases, one of which is water or into a liquid and gaseous phase. The mixture of decomposed hydrate and condensed and uncondensed hydrate forming agent is removed from the cylinder whereupon separation of the two phases occurs. It has been found that after the initial formation of compacted hydrate it is also possible to decompose the hydrate within the compacting cylinder by introducing a heating medium into a jacket surrounding the cylinder.

For a more complete understanding of the invention, reference may be had to the following description and the drawings in which FIGURE 1 is a side view of a cylindrical pressure vessel illustrating the invention;

FIGURE 6 is a graph illustrating the reduction in size of washing equipment obtained when a hydrate mass is compressed prior to washing.

Figure 1:
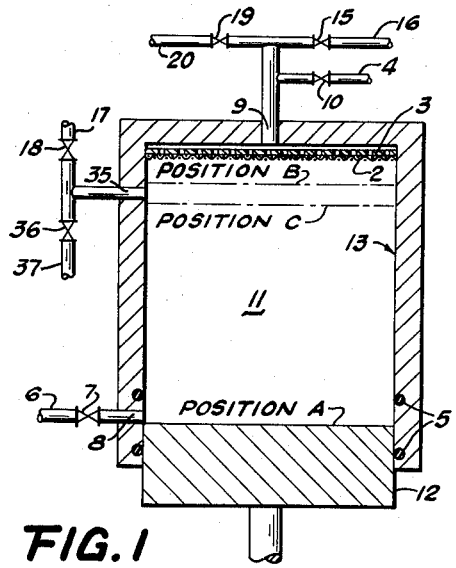

Referring to FIGURE 1 the system and apparatus of this invention includes a pressure zone 11 formed by a pressure zone cylinder 13 capable of being pressurized, by a hydrate cake forming piston 12, to a pressure necessary for the removal of excess entrapped saline water and having a cooling or insulation jacket (not shown) on the outside thereof to control the transfer of heat between zone 11 and the atmosphere around cylinder 13. A slurry containing hydrate brine and/or excess hydrate forming agent in liquid and/or gaseous form is removed from a hydrate forming vessel (not shown) and is introduced into cylinder 13 through conduit 6, valve 7 and port 8 until the cylinder is completely filled. Valve 7 may be a conventional automatic valve, for example, a solenoid operated valve having starting means and cut-off means which regulate the addition of hydrate slurry into the cylinder to completely fill the void therein. The pressure cylinder 13 is equipped at one end with a filter screen 2 or cloth supported by a backup screen or perforated plate 3. The opposite end of the cylinder is equipped with a tight fitting movable piston 12 operated by conventional hydraulic, pneumatic or mechanical means (not shown). O-rings 5 are used to obtain a tight fit between piston 12 and cylinder 13.

The hydrate slurry is fed into cylinder 13 while movable piston 12 is maintained in position A. After the cylinder is completely filled with hydrate slurry, movable piston 12 begins a compression or downward stroke until piston 12 reaches position B in cylinder 13 as shown in the drawings. At position B the hydrate slurry contained in the cylinder is compacted to the predetermined maximum compaction pressure. Excess brine is thereafter removed through filtrate port 9, valve 10 and line 4. If desired, a vacuum may be applied through line 4 to assist in the removal of excess filtrate from the cylinder 13. Upon removal of hydrate filtrate, washing of the compacted hydrate crystal mass occurs by withdrawing piston 4 to position C whereby a wash water entry from port 37 is exposed. Wash water is then introduced through line 35, valve 36, and port 37. The space between piston positions B and C acts as a wash water distributor. The wash water flows through the compacted hydrate bed and out through filter screen 2, port 9, valve 15 and line 16.

After washing, a heating medium such as vapor of the hydrate forming substance is introduced through line 17, valve 18 and port 37. During this phase of the operation the space between piston positions B and C acts as a vapor distributor during decomposition. Part or all of the vapor of the hydrate forming substance will condense on the compacted hydrate thereby causing the hydrate to decompose into two liquid phases, one of which is water, or into a liquid and gaseous phase. After decomposition, the mixture of decomposed hydrate and condensed and uncondensed hydrate forming agent leaves the cylinder through port 9, valve 19 and line 20. If desired, the compacted hydrate crystals may be removed from the cylinder prior to decomposition and the decomposition step may take place in a separate vessel.

Figure 2:
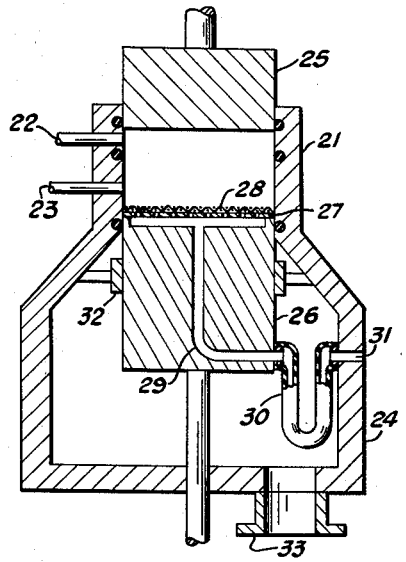
FIGURE 2 is a side view of modification of FIGURE 1 comprising two chambers.

A second embodiment of the above device used in compacting hydrate crystals containing residual brine is shown in FIGURE 2. This apparatus consists of an upper cylinder 21 and a lower cylinder 24 which acts as a receiver for the compacted hydrate. Upper cylinder 21 has a slurry inlet port 22 and a wash water inlet port 23 similar to those shown in FIGURE 1. The hydrate is compacted by upper piston 25. During compaction lower piston 26 is in its highest position sealing the cylinder. Back-up screen 27 and filter screen 28 are operatively associated with lower piston 26. Filtrate is removed through channel 29 connecting filter screen 28 with connection 30 and port 31. Lower piston 26 is guided into position using bearings 32. After termination of the compaction and washing cycle, the lower piston is withdrawn downward and the remaining hydrate cake is forced downward into lower cylinder 24 by movement of upper piston 25. The hydrate compacted layer is thereupon removed from lower cylinder 24 through opening 33.

Figure 3:
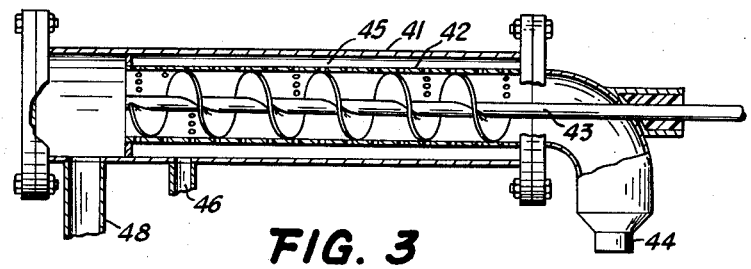
FIGURE 3 is a side view of an extruder-type pressure apparatus consisting of a horizontal cylinder suitable for operating under pressure.

As an illustration of another embodiment of this invention which may be used to separate residual brine from hydrate crystals, FIGURE 3 consists of a device comprising a cylindrical section 41, a filtration screen 42, and a screw 43. Hydrate slurry is fed continuously through the slurry inlet 44. Excess brine is filtered out through screen 42 into annular space 45 wherefrom it is removed through connection 46. Compacted hydrate is moved from right to left through the core and compacts as brine is continuously filtered out. Compacted hydrate is removed through connection 48 by gravity pull or with the addition of a vacuum. A modification of this device, such as a tapering of the cylinder from entry to exit is possible to provide for greater pressure within the cylinder.

Figure 4:
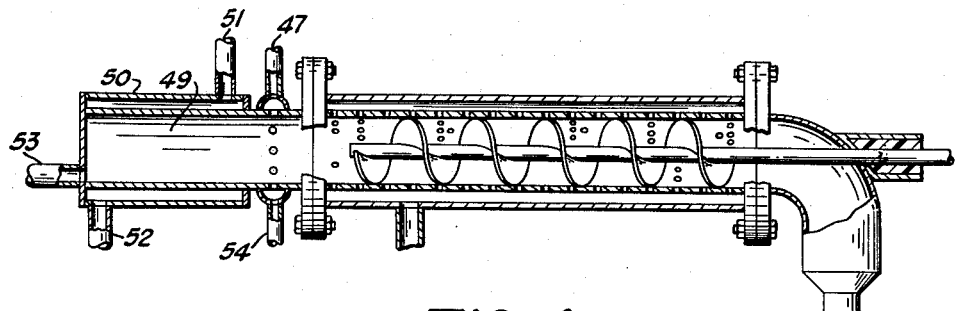
FIGURE 4 is a side view of a variation of FIGURE 3 containing means for washing and decomposing the hydrate.

The apparatus shown in FIGURE 3 may also be modified to provide for washing and decomposition of the hydrate prior to discharge from the cylinder. In this respect reference is made to FIGURE 4 wherein wash water is introduced through connection 47 in a countercurrent flow to the motion of the hydrate cakes. The thus washed hydrate is decomposed in jacket section 49 by introducing the heating medium into the jacket 50 through connection 51. The heating medium may be discharged through connection 52 and the decomposed hydrate is removed from the vessel through connection 53. Alternatively, the hydrate may be decomposed by direct contact heat exchange in section 49 by introducing the heating medium through connection 54. While the compaction cylinder using a piston and an extruder-type screw apparatus have been described herein for the sake of clarity of understanding, it is not intended to so limit the invention to the specific apparatus. For example, the same desired result can be obtained by using a rotating drum filter. It is also feasible to use a travelling screen or a porous belt made, for example, from twilled wire cloth. Such an apparatus resembles a paper-making machine. The belt will carry the hydrate and also pick up a layer of sludge whereupon it will pass under a series of rollers which compact the crystals. Washing in this apparatus is carried out by spraying rinse water in countercurrent flow on the crystal surface. Fresh water may be applied to the last segment of the belt and circulated step-wise, countercurrent to the belt movement. Thus the process of this invention can be advantageously used with any compaction system to which hydrate crystal slurries are applicable.

A more comprehensive understanding of the invention may be obtained by reference to the following illustrative examples which are not intended, however, to be limitative of the invention.

*Example I*

A slurry in an amount of 310 cu. cm. and containing 15 percent propane hydrate in concentrated sea water brine containing 5.6 percent dissolved salts is charged into a compacting cylinder such as that described in FIGURE 1 and compacting pressure of 30 p.s.i. is applied. Under this pressure, 211 g. of brine containing 5.6 percent of dissolved salts is forced out of the cylinder. The volume of the cylinder at this point is 103 cu. cm. The cake was removed from the cylinder and decomposed. The aqueous phase was found by chloride analysis to contain 3.12 percent dissolved salts, a reduction from the original hydrate slurry of over 44 percent dissolved salts.

*Example II*

A slurry in an amount of 284 cu. cm. and containing 15.1 percent propane hydrate by volume in concentrated sea water brine containing 5.5 percent dissolved salts was charged into the cylinder shown on FIGURE 2 and pressure was applied to the slurry. When pressure had reached 44 p.s.i., 197 g. of brine containing 5.5 percent dissolved salts had been collected. The volume of the cylinder at this point was 113 cu. cm. The aqueous phase obtained upon decomposition of the hydrate cake contained 3.38 percent dissolved salts.

*Example III*

A slurry in an amount of 310 cc. containing 15.7 percent by volume of propane hydrate suspended in concentrated sea water brine containing 5.6 percent dissolved salts was introduced into the compacting cylinder of FIGURE 1. The slurry was then compressed under pressure of 2440 p.s.i. Brine in an amount of 249.1 g. was collected. The propane hydrate remaining in the cylinder was decomposed and the hydrocarbon and aqueous phases were separated. It was found by chloride analysis that the aqueous phase contained 1.49 percent dissolved salts.

*Example IV*

A slurry in an amount of 297 cc. and containing 15.1 percent by volume of propane hydrate suspended in concentrated sea water brine containing 5.5 percent dissolved salts was introduced into a compacting cylinder at a pressure of 80 p.s.i.a. The slurry was compressed to 4940 p.s.i.a. and 237.5 g. of brine were forced out of the cylinder. Propane hydrate remaining in the cylinder was decomposed and the hydrocarbon and aqueous phases were separated by decantation. The chloride analysis revealed that the aqueous phase contained 1.14 percent dissolved salts.

*Example V*

A slurry in an amount of 307 cc. and containing 15.8 percent by volume of propane hydrate suspended in concentrated sea water brine containing 5.6 percent dissolved salts was introduced into the compacting cylinder of FIGURE 3. The slurry was compressed to 6940 p.s.i and 253.1 g. of brine were forced out of the cylinder through the filter screen. The propane hydrate contained in the cylinder was decomposed and the hydrocarbon and the aqueous phase were separated by decantation. A chloride analysis revealed that the aqueous phase contained 1.18 percent dissolved salts.

In each of the above examples a great reduction in salt content was obtained by the application of varying pressures. As a result, the separation of potable water from brackish or sea water using a hydrating technique is improved considerably. A great savings in wash water is obtained because as the salt content of the hydrate crystals becomes, less, the purified water needed to wash these crystals becomes less.

Figure 5:
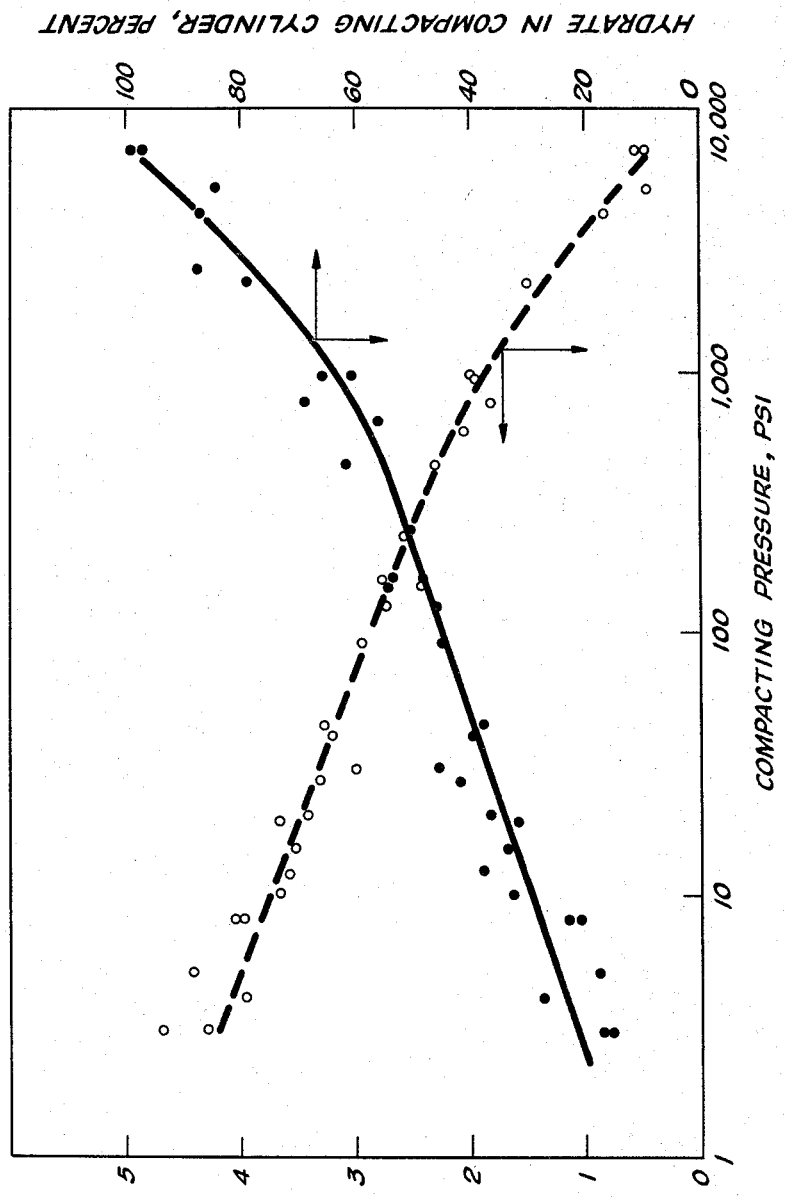
FIGURE 5 is a graph illustrating the effect pressure of varying range has on removal of residual brine from hydrate crystals.

To further describe the unique results obtained using the process of this invention FIGURE 5 graphically illustrates the salt content of decomposed propane hydrate after compaction at various pressures. In all instances a reduction of salt content occurs with the application of pressure.

In addition to a savings in the amount of purified water needed to wash hydrate crystals prior to decomposition, the process of this invention advantageously provides for a reduction in the size of equipment used for washing. Thus a costly time consuming step in the process of purifying water has been considerably overcome. This advantage results from the fact that the hydrate crystals to be washed occupy a greater volume of the washer equipment than ever before. A high solids content is obtained with the removal of excess brine. FIGURE 6 illustrates the reduction in area and length of a commercial washer when compression is applied to a hydrate slurry. This effect is shown in FIGURE 6 using the change from 30 percent solids by volume to 50 percent solids by volume.

The described method directly reduces the amount of occluded and trapped residual brine contained in a slurry of hydrate crystals. Also the described method reduces the wasteful use of purified water heretofore necessary when hydrate crystals were washed prior to decomposition.

I claim:

1. A process for removing occluded aqueous system from hydrate crystals comprising the steps of:
   (a) introducing a slurry of hydrate crystals in an aqueous solution to a chamber;
   (b) applying pressure to the slurry great enough to shear the crystal agglomerates at less than the pressure required to crush individual crystals, whereby said occluded aqueous system is squeezed from said crystals;
   (c) removing from the chamber the exudate pressed from the decreasing volume of crystals; and
   (d) maintaining the crystals at a temperature at which they remain solid during the application of pressure.

2. A process for removing occluded aqueous system from hydrate crystals comprising the steps of:
   (a) introducing a slurry of hydrate crystals in an aqueous solution to a chamber;
   (b) applying pressure to the slurry great enough to shear the crystal agglomerates at less than the pressure required to crush individual crystals, whereby said occluded aqueous system is squeezed from said crystals;
   (c) removing from the chamber the exudate pressed from the decreasing volume of crystals;
   (d) introducing fresh wash water into said cylinder to thereby cleanse the decreased volume of hydrate crystals of any remaining residual brine; and
   (e) maintaining the crystals at a temperature at which they remain solid during the application of pressure.

3. A process for removing occluded aqueous system from hydrate crystals comprising the steps of:
   (a) introducing a slurry of hydrate crystals in an aqueous solution to a chamber;
   (b) applying pressure to the slurry great enough to shear the crystal agglomerates at less than the pressure required to crush individual crystals, whereby said occluded aqueous system is squeezed from said crystals;
   (c) removing from the chamber the exudate pressed from the decreasing volume of crystals;
   (d) introducing fresh wash water into said cylinder to thereby cleanse the decreased volume of hydrate crystals of any remaining residual brine;
   (e) maintaining the crystals at a temperature at which they remain solid during the application of pressure; and
   (f) decomposing said compacted hydrate crystals by introducing heating means into said chamber.

References Cited by the Examiner

UNITED STATES PATENTS

| | | | |
|---|---|---|---|
| 2,921,444 | 1/60 | Bump et al. | 62—58 |
| 3,119,771 | 1/64 | Cottle | 210—59 |

MORRIS O. WOLK, *Primary Examiner.*